(No Model.)

W. MAYBURY.
STEAM DRYING CYLINDER.

No. 284,877. Patented Sept. 11, 1883.

WITNESSES:
John M. Deemer
C. Sedgwick

INVENTOR:
W. Maybury,
BY Munn & Co.
ATTORNEYS.

UNITED STATES PATENT OFFICE.

WILLIAM MAYBURY, OF GARNERSVILLE, N. Y., ASSIGNOR TO HIMSELF, JAMES GREENWOOD, AND THOMAS WOLSTENHOLME, BOTH OF SAME PLACE.

STEAM-DRYING CYLINDER.

SPECIFICATION forming part of Letters Patent No. 284,877, dated September 11, 1883.

Application filed March 26, 1883. (No model.)

*To all whom it may concern:*

Be it known that I, WILLIAM MAYBURY, of Garnersville, in the county of Rockland and State of New York, have invented certain new and useful Improvements in Steam - Drying Cylinders, of which the following is a full, clear, and exact description.

My invention relates to such steam-drying cylinders as are used for drying silk, cotton, wool, worsted, paper, &c., and has for its object to make the bearings of the cylinder steam-tight without the use of loose packing; and to this end my invention consists in forming or providing the hollow steam-inlet journal of the cylinder with rigid peripheral rings, that fit in corresponding grooves or recesses formed in the parts of the journal-box.

The invention also consists in forming the upper removable part of the journal-box with an oil-cup that communicates with the said recesses, and is closed at its ends with screw-plugs that are adapted to be removed for cleaning the oil-cup.

Reference is to be had to the accompanying drawings, forming a part of this specification, in which similar letters of reference indicate corresponding parts in both the figures.

Figure 1:
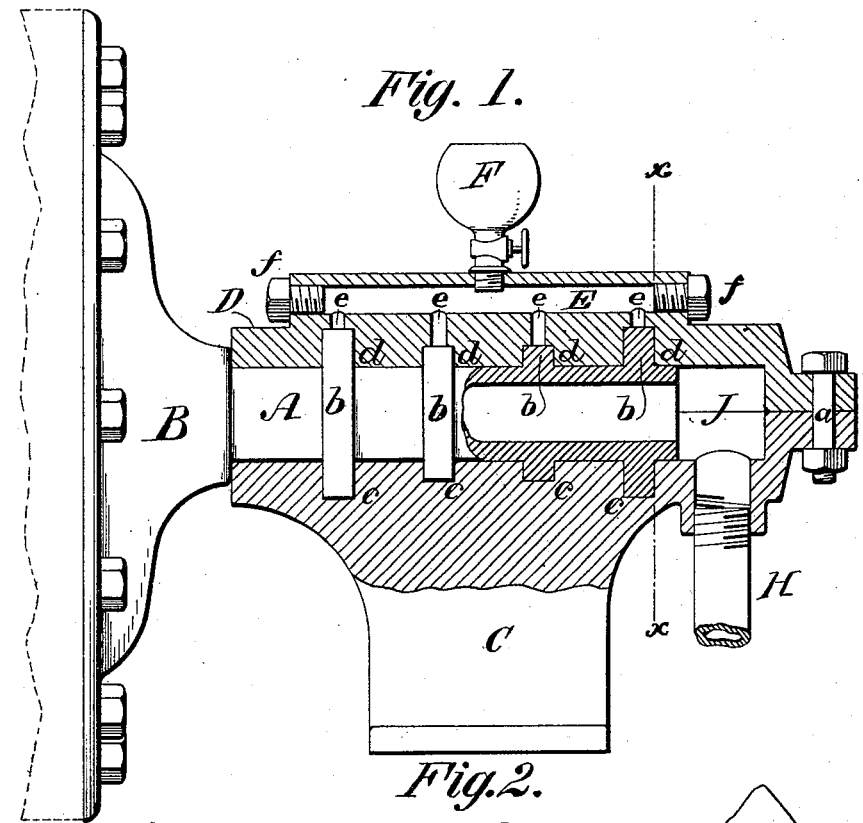
Figure 2:
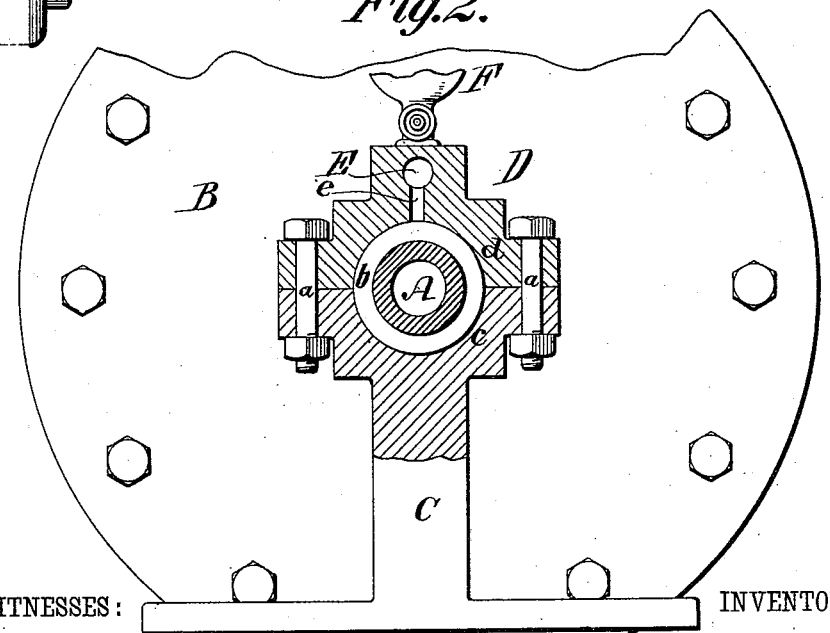

Figure 1 is a longitudinal sectional elevation of my improved hollow journal and journal-box; and Fig. 2 is a transverse sectional elevation of the same, taken on the line $x\ x$ of Fig. 1.

A represents the hollow steam-inlet journal, which is attached to or cast with the cylinder-head B.

C and D represent, respectively, the stationary and removable parts or plates of the journal-box, which are bolted together to form the complete box by the bolts $a\ a$. The hollow journal A has cast or formed upon it the peripheral rings $b$, and the plates C D of the journal-box are formed with the corresponding semicircular recesses or grooves, $c\ d$, in which the rings $b$ snugly fit, as illustrated in the drawings, when the parts of the box are bolted together.

Upon the removable plate D of the journal-box is formed the oil-cup E, which is supplied with oil from the primary oil-cup F, and supplies oil to all of the rings $b\ b$, and thence to every part of the journal, through the orifices $e\ e$, and the ends of this oil-cup E are closed by the screw-plugs $f\ f$, which may be removed for cleaning the said cup.

J is an internally-screw-threaded opening formed in an extension of the stationary journal-plate C, in which opening the steam-supply pipe H, coming from a suitable steam-generator, is screwed. The steam from the pipe H first enters the chamber J, formed by the journal-box plate C D in rear of the hollow journal A, and from thence passes through the hollow journal A into the drying-cylinder in the ordinary way, and the pressure of the steam against the rear end of the hollow journal and against the rear faces of the rings $b$, if any should enter the recesses $c\ d$, will force the journal $a$ forward and cause the front faces of the rings to form steam-tight joints with the contiguous walls of the recesses $c\ d$, and thus prevent all escape of steam without the use of separate loose packing, which is expensive to fit and always liable to get out of order, entailing delay and expense for repairs.

The oil-cup E, besides insuring perfect lubrication of the journal A, may be quickly and easily cleaned by simply removing the screw-plugs $f\ f$ and passing a suitable swab backward and forward through it.

Having thus described my invention, what I claim as new, and desire to secure by Letters Patent, is—

1. The hollow journal A, having the rings $b$, in combination with the box-plates C D and grooves or recesses $c\ d$, substantially as and for the purposes set forth.

2. The oil-cup E, having its ends closed by the removable plugs $f\ f$ and communicating with the journal-bearing, substantially as and for the purposes set forth.

3. The journal-plate C, formed with the recesses $c$, and the removable plate D, formed with the recesses $d$ and oil-cup E, communicating with the recesses $d$ through the orifices $e$, and closed with the plugs $f\ f$, in combination with the hollow journal A, formed with the peripheral rings $b$, substantially as shown, and for the purposes described.

WILLIAM MAYBURY.

Witnesses:
JACOB E. CONKLIN,
CYRILLUS MYERS.